United States Patent
Merlo et al.

(10) Patent No.: US 12,392,471 B2
(45) Date of Patent: Aug. 19, 2025

(54) BACKLIT LIGHT ASSEMBLY FOR A ROAD VEHICLE AND RELATED ROAD VEHICLE HAVING A PARTIALLY TRANSPARENT SUBSTRATE

(71) Applicant: FERRARI S.P.A., Modena (IT)

(72) Inventors: Matteo Merlo, Modena (IT); Giuseppe Bagnardi, Modena (IT); Flavio Manzoni, Modena (IT); Gianmaria Fulgenzi, Modena (IT); Johann Frederic Max Lemercier, Modena (IT)

(73) Assignee: FERRARI S.P.A., Modena (IT)

( * ) Notice: Subject to any disclaimer, the term of this patent is extended or adjusted under 35 U.S.C. 154(b) by 0 days.

(21) Appl. No.: 18/762,845

(22) Filed: Jul. 3, 2024

(65) Prior Publication Data
US 2025/0052399 A1 Feb. 13, 2025

(30) Foreign Application Priority Data
Jul. 6, 2023 (IT) .................. 102023000014139

(51) Int. Cl.
*F21S 43/15* (2018.01)
*F21S 45/10* (2018.01)

(52) U.S. Cl.
CPC .............. *F21S 43/15* (2018.01); *F21S 45/10* (2018.01)

(58) Field of Classification Search
CPC ...... F21S 43/235; F21S 43/236; F21S 43/239; F21S 43/241; F21S 43/242; F21S 43/243; F21S 43/14; F21S 43/15
See application file for complete search history.

(56) References Cited

U.S. PATENT DOCUMENTS

| | | | |
|---|---|---|---|
| 7,052,074 B2 * | 5/2006 | Dringenberg | B62D 35/007 296/180.5 |
| 9,753,208 B2 * | 9/2017 | Ban | F21S 43/249 |
| 2016/0091653 A1 | 3/2016 | Ban et al. | |

FOREIGN PATENT DOCUMENTS

| | | |
|---|---|---|
| CN | 201102500 Y | 8/2008 |
| DE | 102018100819 A1 | 7/2019 |
| EP | 2169296 A1 | 3/2010 |
| EP | 2816276 A2 | 12/2014 |
| EP | 3372892 A1 | 9/2018 |
| EP | 3543598 A1 | 9/2019 |
| EP | 2635842 B1 | 8/2020 |

(Continued)

OTHER PUBLICATIONS

Machine Xlation of CN01102500 (Year: 2008).*

(Continued)

*Primary Examiner* — Robert J May
(74) *Attorney, Agent, or Firm* — CANTOR COLBURN LLP

(57) ABSTRACT

Light assembly comprising: a support structure; an illuminating source unit, mounted on board the support structure; an at least partially transparent polymeric substrate extending between a proximal end, mounted at the support structure and the illuminating source unit, and a distal end, opposite the proximal end and projecting from the support structure; wherein the polymeric substrate comprises a thickness lower than the other dimensions and is configured to be traversed, along its thickness, by a light beam emitted from the illuminating source unit at the proximal end, which exits at least from an outlet profile arranged at the distal end.

15 Claims, 5 Drawing Sheets

(56) References Cited

FOREIGN PATENT DOCUMENTS

| | | |
|---|---|---|
| EP | 3862624 A1 | 8/2021 |
| FR | 3054641 A1 | 2/2018 |
| FR | 3097026 A1 | 12/2020 |
| JP | 2012064535 A | 3/2012 |
| JP | 2018137127 A | 8/2018 |
| JP | 2018198134 A | 12/2018 |
| KR | 20180076708 A | 7/2018 |

OTHER PUBLICATIONS

Italian Search Report dated Nov. 16, 2023 for Italian Patent Application No. 202300014139, untranslated, 9 pages.
Extended European Search Report for European Patent Application No. 24185637.6, Date of Mailing: Oct. 16, 2024; 11 pages.

* cited by examiner

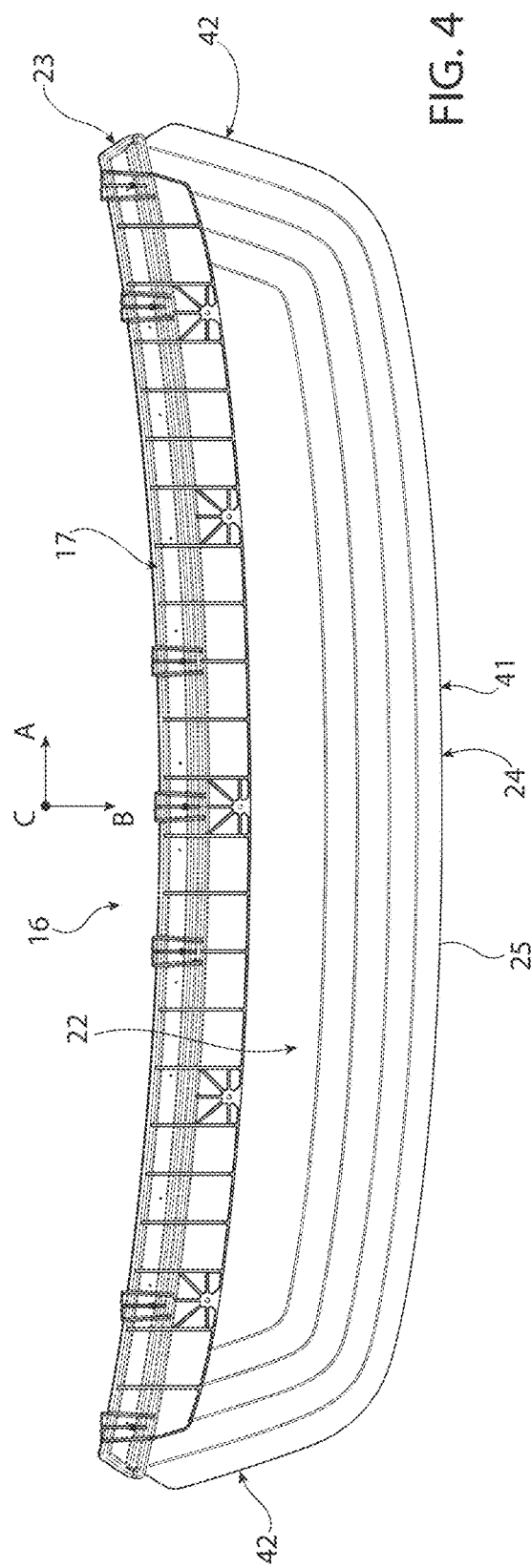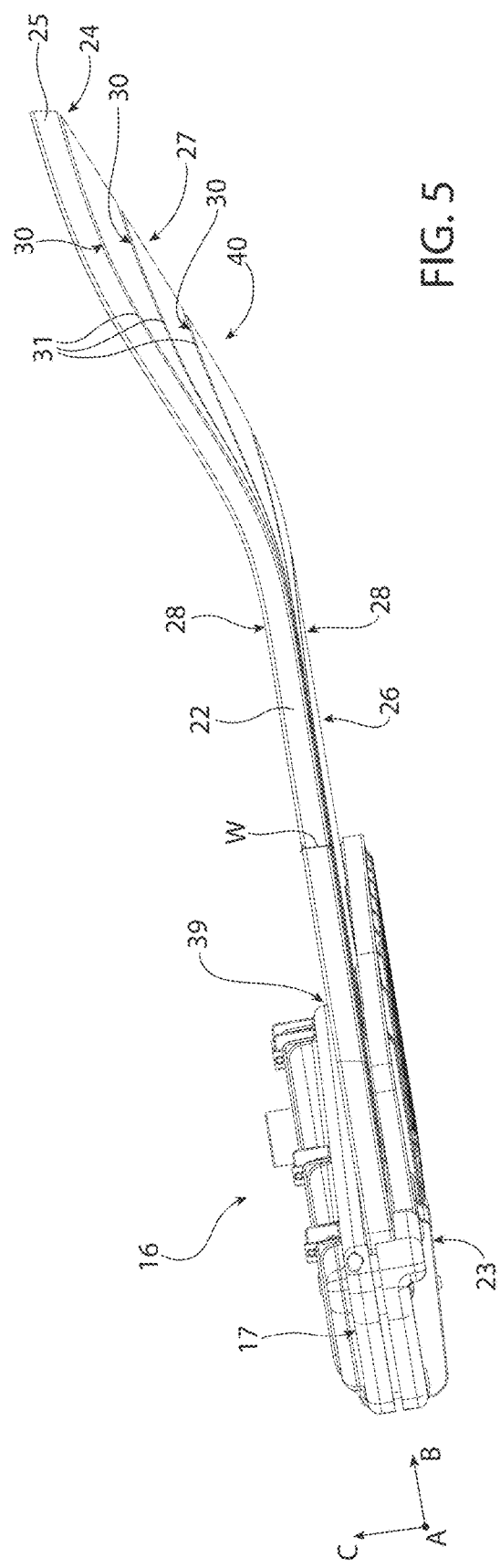

US 12,392,471 B2

BACKLIT LIGHT ASSEMBLY FOR A ROAD VEHICLE AND RELATED ROAD VEHICLE HAVING A PARTIALLY TRANSPARENT SUBSTRATE

CROSS-REFERENCE TO RELATED PATENT APPLICATIONS

This patent application claims priority from Italian patent application no. 102023000014139 filed on Jul. 6, 2023, the entire disclosure of which is incorporated herein by reference.

TECHNICAL FIELD

The present invention relates to a light assembly for a road vehicle and to a related road vehicle provided with said assembly.

In particular, the present invention has an advantageous, but not exclusive, application in a rear light assembly for a high-performance automobile, to which the description that follows will refer explicitly, but without thus losing its general nature.

PRIOR ART

As known, an automobile has a complex lighting system usually comprising a plurality of lights.

In particular, the lights are devices adapted to generate a light beam to signal its presence on the road (normally arranged at both the front and the rear, as in the case of position lights and daytime running lights) or to make the road surface visible to the driver (such as the headlights arranged at the front of the vehicle, for example).

Generally, the lights are also called headlights, projectors or optical units.

In the last decade, LED technology has been widely used in the car industry, and in particular in the lights. Increasingly smaller and sophisticated diodes allow certain design constraints to be eliminated, allowing increasingly original light forms to be created. These include the so-called "coast-to-coast" lights, usually installed horizontally in the rear zone as daytime running lights or position lights (or as brake lights, increasing their intensity). These lights are thus named because they cross from side to side, horizontally, a large part of the rear of the road vehicle.

In these cases, a LED strip is usually arranged so as to direct the light beam backwards, in order to be directly visible, unless a transparent or opaque protection is present, to the vehicles following behind. In other words, the LED strip is usually so to as to direct the light beam along a parallel direction to a longitudinal axis of the vehicle, with the direction diverging from the centre of the road vehicle towards the rear.

In particular, these technologies currently provide for the installation of a single LED strip at the rear end of the light, so that the light visible from the rear of the road vehicle is directly the one of the LEDs composing the strip.

However, these technologies cause certain disadvantages in mounting and possibly in replacement of the light in the case of damage.

In fact, the mounting of the LED strip in a manner that it is directly visible from the outside requires a high level of accuracy, since any defect in the positioning causes an aesthetic visual defect of the road vehicle.

Furthermore, since the diodes are particularly exposed, they could break in the case of impact with obstacles and thus need to be replaced together with the polymeric part which usually protects them.

In addition, according to the solutions of the prior art, a single LED strip is present, which defines a light emission that is particularly thin and not always appreciable at long distances. In order to improve the visibility of this emission, by increasing its thickness, it would therefore be necessary to install further parallel LED strips (or matrix LED groups).

Lastly, the need to position the diodes so that they are directly visible imposes design constraints from a stylistic viewpoint, since the position of the diodes and the power supply lines of said diodes must always be considered.

DESCRIPTION OF THE INVENTION

The object of the present invention is to provide a light assembly for a road vehicle and a relative road vehicle provided with said assembly that are at least partially free from the problems described here above and, at the same time, are simple and efficient to manufacture.

According to the present invention, a backlit light assembly for a road vehicle and a relative road vehicle are provided according to what is claimed in the independent claims that follow and, preferably, in any one of the claims that are directly or indirectly dependent upon the independent claims.

The claims describe preferred embodiments of the present invention and form an integral part of this description.

BRIEF DESCRIPTION OF THE DRAWINGS

The present invention will now be described with reference to the appended drawings, which illustrate a non-limiting example embodiment thereof, wherein:

FIG. 4 is a plan view of the light assembly isolated from the vehicle of FIG. 3;

FIG. 5 is a side view of the light assembly of FIG. 4;

PREFERRED EMBODIMENTS OF THE INVENTION

Figure 1:
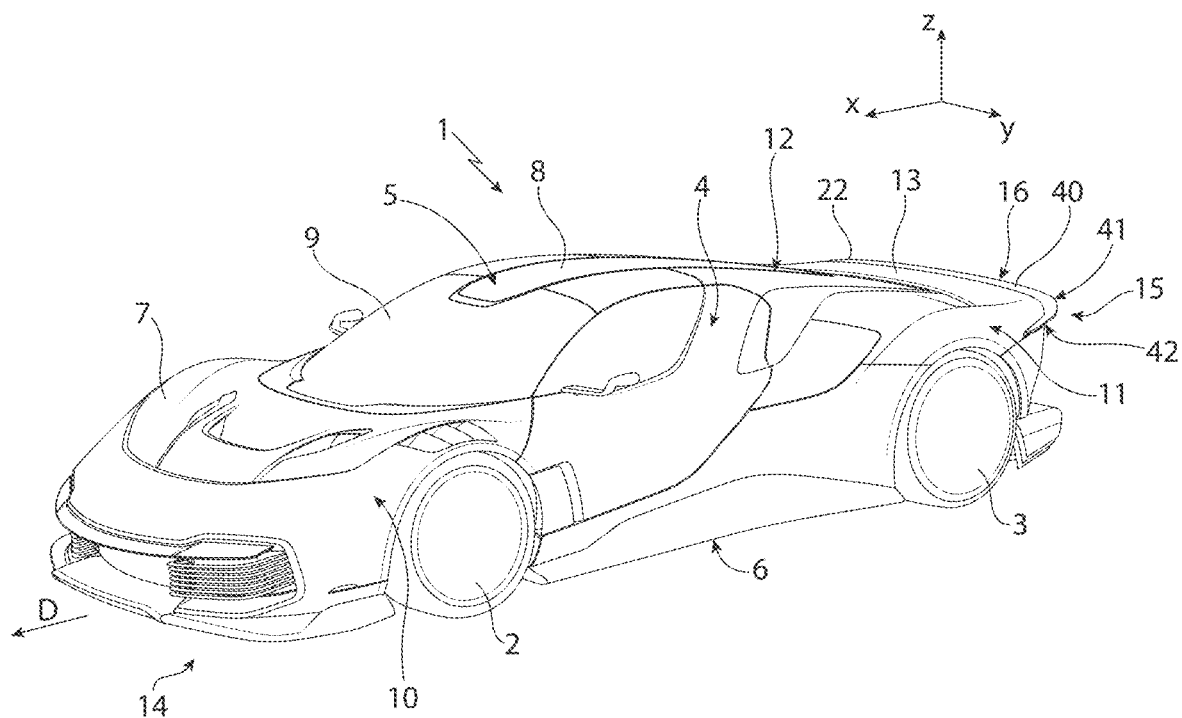
FIG. 1 is a front and schematic perspective view, with parts removed for clarity, of a road vehicle realised according to the dictates of the present invention.
Figure 2:
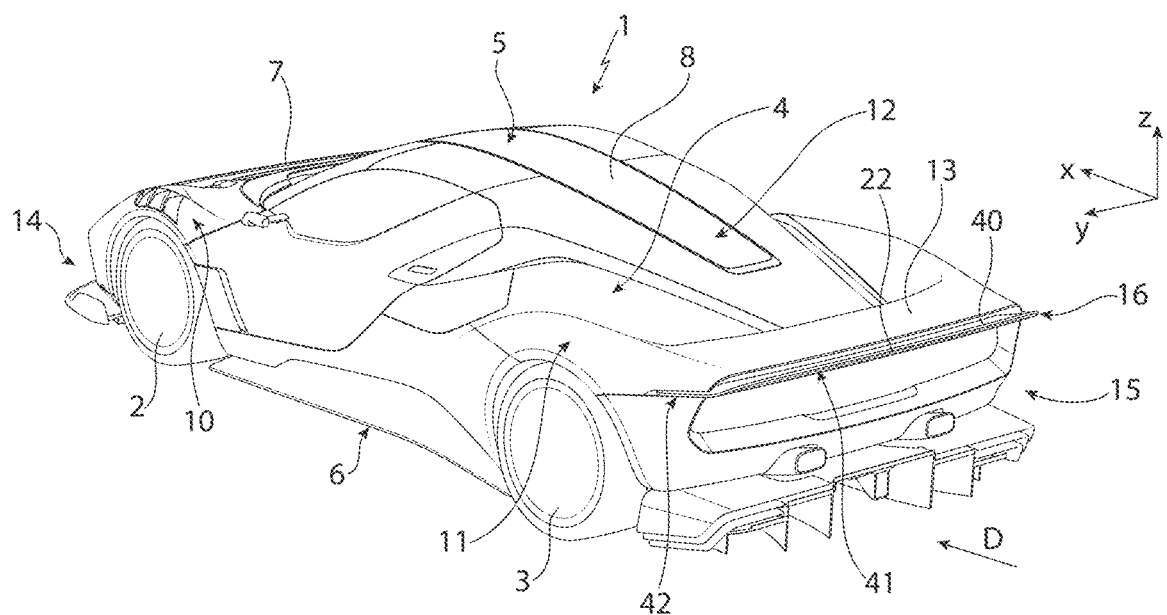
FIG. 2 is a rear and schematic perspective view, with parts removed for clarity, of the road vehicle of FIG. 1.

In FIGS. 1 and 2, the number 1 denotes, in its entirety, a road vehicle comprising two front wheels 2 and two rear wheels 3 and comprising an outer body 4 and a passenger compartment 5, obtained inside the outer body 4 between the front and rear wheels 2, 3 themselves.

The same reference numbers and reference letters in the figures identify the same elements or components with the same function.

In this description, the term "second" component does not imply the presence of a "first" component. Such terms are, in fact, adopted as labels to improve clarity and should not be intended as limiting.

The elements and features illustrated in the different preferred embodiments, including the drawings, may be combined with each other without deviating from the scope of protection of this application as described below.

It is specified that, in the description that follows, expressions such as "above", "below", "front", "rear" and similar are used with reference to conditions of normal travel of the road vehicle 1 along the normal travel direction D.

As shown in the non-limiting embodiment of FIG. 1, it is also possible to define:
- a longitudinal axis X, pertaining to the automobile 1 and arranged, in use, horizontal and parallel to a normal travel direction D of the vehicle 1;
- a transverse axis Y, pertaining to the automobile 1 and arranged, in use, horizontal and orthogonal to the axis X; and
- a vertical axis Y, pertaining to the automobile 1 and arranged, in use, vertical and orthogonal to the axes X, Y.

The outer body 4 comprises, among other things, an undercarriage 6, a bonnet 7, a roof 8 and a windscreen 9 extending between the bonnet 7 and the roof 8.

In particular, the undercarriage 6 extends between the front wheels 2 and the rear wheels 3.

The outer body 4 also comprises two front sidewalls 10, extending on opposite sides of the bonnet 7, and two opposite rear sidewalls 11, aligned with, and distanced from, the respective front sidewalls 10.

The outer body 4 also comprises a rear window 12 and a boot 13.

The windscreen 9 is coupled below with the bonnet 7 and above with the roof 8 and extends between the front sidewalls 10.

The rear window 12 is coupled below with the boot 13 and above with the roof 8. The rear window 12 also extends between the rear sidewalls 11.

In particular, the outer body 4 comprises a front portion 14 and a rear portion 15 with respect to a travel direction D of the road vehicle 1.

The road vehicle 1 advantageously comprises a (backlit) light assembly 16 mounted on the front portion 14 and/or on the back portion 15, as shown in the non-limiting embodiments of the appended figures. In particular, the light assembly 16 is configured to be visible (only) from the outside of the road vehicle 1, for example from a position behind the road vehicle 1 in the case of the embodiments of the appended figures.

Advantageously, the light assembly 16 comprises a support structure 17 configured to be mounted (therefore coupled, for example by means of fastening members of a known type) on the outer body 4 of the road vehicle 1, in particular at the front portion 14 and/or the rear portion 15, as shown in the appended figures.

The support structure 17 extends primarily along a first direction A, which corresponds primarily (coincides) substantially with the transverse axis Y of the road vehicle 1. The term "correspond primarily" in relation to an axis and to a direction means that there is an angle lower than 45°, in particular lower than 20°, between the two of them.

In addition, the light assembly 16 comprises an illuminating source unit 18, which is mounted on board the support structure 17 and comprises a plurality of luminous devices 19 arranged mainly along the first direction A (i.e. along the transverse axis Y).

Advantageously but not necessarily, the luminous devices 19 are a strip 20 of light-emitting diodes 21 (LED). In this manner, it is easily possible to adjust the intensity, the colour and possibly also the frequency of the light radiation emitted by the unit 18.

Advantageously, the light assembly 16 also comprises an at least partially, in particular totally, transparent polymeric substrate 22.

Preferably but not in a limiting manner, the polymeric substrate 22 has a flat shape, i.e. extending primarily in two directions and having a limited thickness W.

In particular, but not in a limiting manner, the thickness W of the polymeric substrate (22) is substantially constant. In other words, the thickness W does not vary, or varies in a negligible manner (for example, of the order of one millimetre), along both or only one of the two extension directions.

In detail, the polymeric substrate 22 extends along a second direction B perpendicular to the first direction A and corresponding primarily (coinciding substantially) with the longitudinal axis X of the road vehicle 1, between a proximal end 23, mounted at the support structure 17 and the illuminating source unit 18, and a distal end 24, opposite the proximal end 23 and projecting from the support structure 17.

Advantageously, but not in a limiting manner, the thickness W of the polymeric substrate 22 is constant along the direction B, between the proximal end 23 and the distal end 24. According to several variants, the thickness W varies, in particular increases, from the proximal end 23 to the distal end 24.

Figure 3:
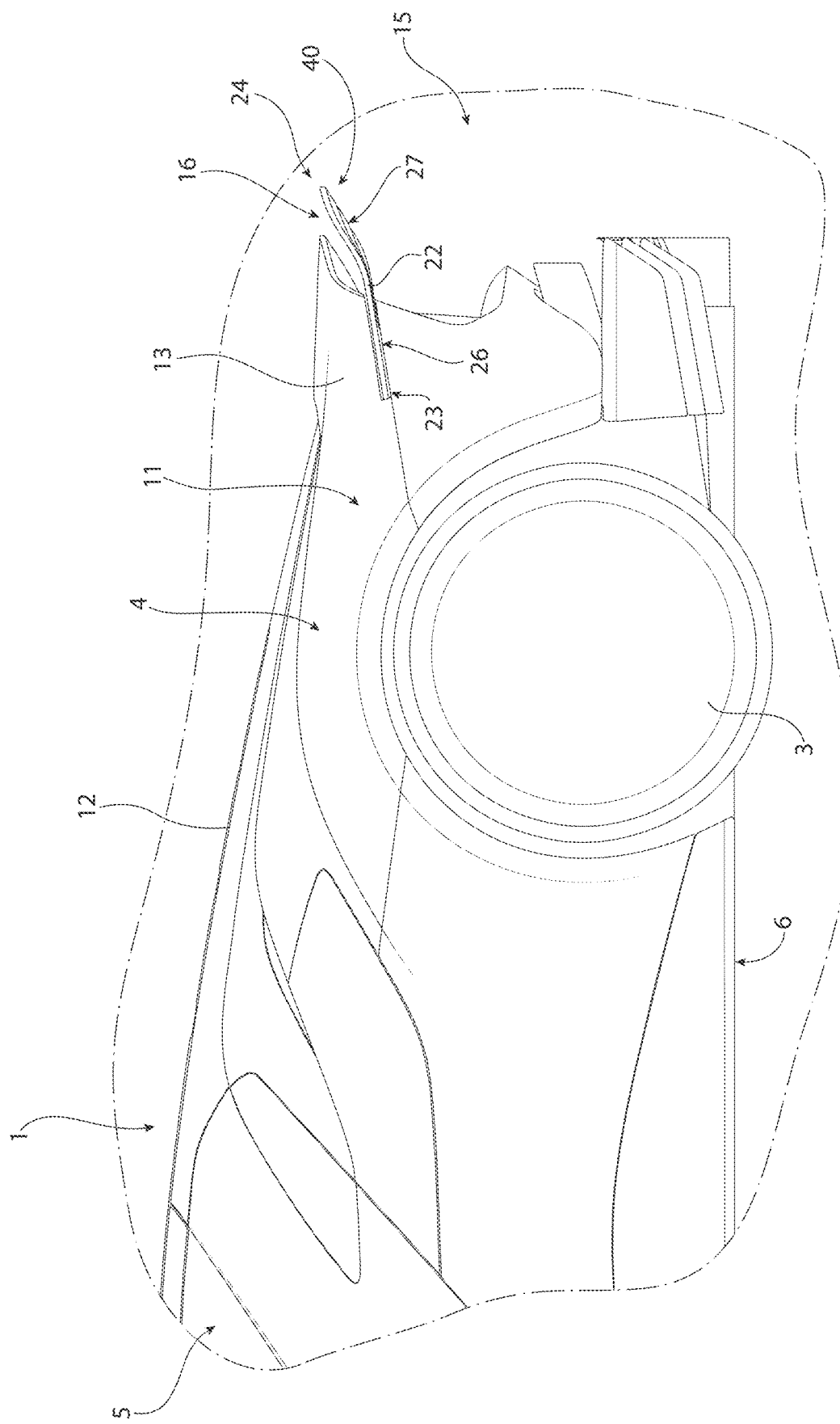
FIG. 3 is a side and schematic view, with parts removed for clarity, of a rear side portion of the vehicle of FIGS. 1 and 2, in which a light assembly in accordance with the present invention is visible.

In particular, but not in a limiting manner, the distal end 24 exits in a cantilevered manner (preferably behind, as shown in FIG. 3) from the outer body 4 of the road vehicle 1. In other words, the distal end 24 projects from the inside to the outside of the vehicle 1. More in particular, the distal end 24 is exposed outside of the vehicle 1, i.e. directly visible from the outside, without protection means and/or covering members, such as glass, lenses or further polymeric substrates.

As previously mentioned, therefore, the polymeric substrate 22 comprises a thickness W lower than the other dimensions (along directions A and B) and is configured to be traversed, along its thickness W, by a light beam L emitted by the luminous devices 19 at the proximal end 23, which exits at least from an outlet profile 25 arranged at the distal end 24.

In other words, the light beam L emitted by the diodes 21 traverses the polymeric substrate 22 primarily (substantially) along the longitudinal axis X of the road vehicle 1 (i.e. along the first direction A).

Preferably, but not in a limiting manner, the substrate 22 determines a rear spoiler of the road vehicle 1 (i.e. having aerodynamic and/or aesthetic functions).

In the non-limiting embodiment of the appended figures, the main outlet profile 25 is substantially the end profile of the polymeric substrate 22. In particular, the outlet profile 25 is substantially parallel to the vertical axis Z. In this manner, the visibility of the beam L exiting from it is maximised, since the profile 25 causes a clean interruption of the substrate 22.

Advantageously, but not in a limiting manner, the polymeric substrate 22 is made (at least in part, in particular entirely) of methacrylate (PMMA). In detail, said material may be very transparent (even more than glass) and possesses characteristics of behaviour similar to optical fibre in quality of transparency. In this manner, the light beam L emitted by the diodes 21 may traverse almost completely, and in any case efficiently, the substrate 22 until it exits from the profile 25.

In addition, methacrylate also possesses important mechanical characteristics that make it difficult to break, increasing the safety in the case of impacts (no shards would fly) and simplifying its replacement in safety.

As shown in the non-limiting embodiment of FIG. 3, the light assembly 16 is mounted on the rear portion 15, so as to be slightly inclined with respect to the longitudinal axis X of the road vehicle 1.

Figure 6:
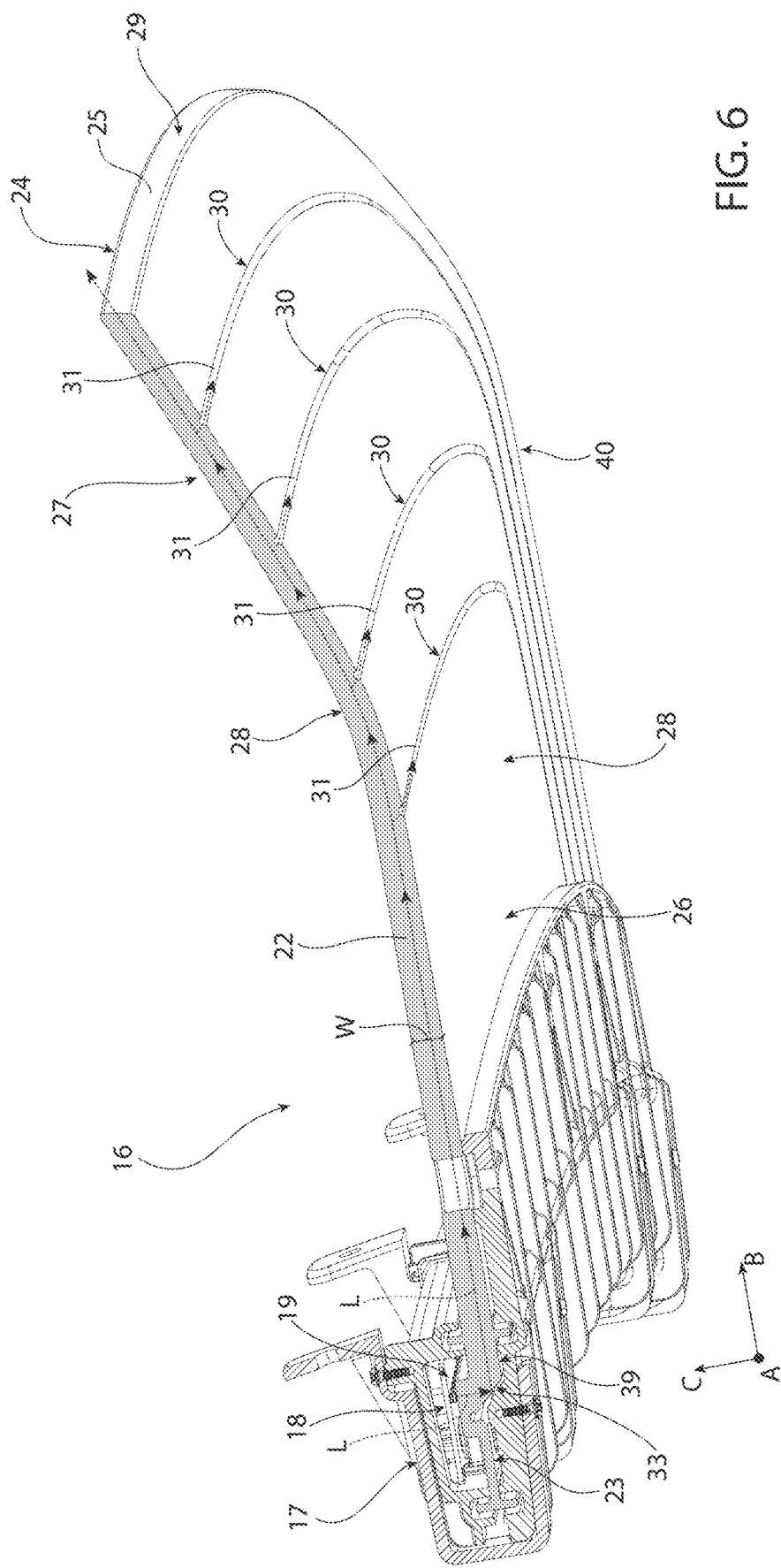
FIG. 6 is a perspective and sectional view of the light assembly of FIGS. 4 and 5.

Preferably but not in a limiting manner, and as shown clearly in FIGS. 5 and 6, the polymeric substrate 22 comprises, along the second direction B (i.e. along the axis X), starting from the proximal end 23 toward the distal end 24, a first portion 26 and a second portion 27, wherein the second portion 27 is inclined, in particular upwardly, with respect to the first portion 26. In this manner, the surface of substrate 22 visible for a vehicle following the road vehicle 1 is increased.

Advantageously, in accordance with what is described above, the polymeric substrate 22 comprises two main outer surfaces 28 facing each other and a minor lateral surface 29 connecting the two main outer surfaces 28. The outlet profile 25 is at least part of the minor lateral surface 29.

Preferably but not in a limiting manner, the two main surfaces 28 are striped surfaces, in particular, extendible.

Advantageously, furthermore, according to what is shown by FIGS. 4 and 6, the polymeric substrate 22 comprises, between the proximal end 23 and the distal end 24, further outlet profiles 30 obtained on at least one of the main outer surfaces 28.

In particular, in the non-limiting embodiment shown, the further outlet profiles 30 are obtained on the main lower surface 28, so as to be better visible from the rear of the road vehicle 1. The combination of the main outlet profile 25 with the further outlet profiles 30 allows the light emission exiting from the substrate 22 to be thickened, making the vehicle more visible and recognisable, even at long distances.

The further outlet profiles 30 represent interruptions in the continuity of thickness W of the polymeric substrate 22 and cause the exit of part of the light beam L precisely at these discontinuities, according to known principles of light refraction in a transparent body.

Advantageously, the further outlet profiles 30 are grooves 31, in particular millings that partially interrupt the passage of the light beam L towards the outlet profile 25, determining an intermediate partial exit thereof.

Advantageously, but not in a limiting manner, the grooves 31 determine the interruption of one profile of the at least one main outer surfaces 28 that otherwise would be continuous, i.e. that excepted where the grooves are is continuous. According to the non-limiting embodiment shown, the grooves 31 are obtained on the main lower surface 28 and interrupt its profile.

As shown in the non-limiting embodiments of FIGS. 4 and 6, the further outlet profiles 30 are concentric to each other, namely have the same shape, but different dimensions, as the outlet profile 25, thus of at least part of the lateral surface 29. In particular, the profiles 30 are symmetric figures with respect to the same centre of symmetry. More in particular, as shown in FIG. 4, the profiles 30 are substantially projections of the profile 25 on the plane AB, scaled dimensionally and homogeneously on both axes A and B with respect to the same point of reference. In this manner, the view at a distance of the road vehicle 1 has a homogeneous form (and achieves the effect of thickening the light emission of only the outlet profile 25).

Preferably but not in a limiting manner, the outlet profile 25 comprises at least two rectilinear portions parallel to a direction of travel of the road vehicle 1 and at least one curved portion, wherein the at least one curved portion unites the rectilinear portions. In other words, the rectilinear portions extend mainly along the direction of travel.

In particular, in the non-limiting embodiment of FIG. 4, the profile 25 comprises two rectilinear portions substantially parallel to the direction B. More in particular, the rectilinear portions have a component along the axis B and a component along the axis A, and the component along axis B is, preferably, considerably (more than double), larger than the component along axis A.

Advantageously, but not in a limiting manner, the illuminating source unit is integrated into the support structure 17. Therefore, the luminous devices 19 are not directly visible from the outside of the road vehicle 1. In this manner, according to what is described here, it is possible to obtain different luminous effects by exploiting the refraction internal to the polymeric substrate 22, which have no design constraints in relation to the direct view of the diodes 21, which are also more protected.

Figure 7:
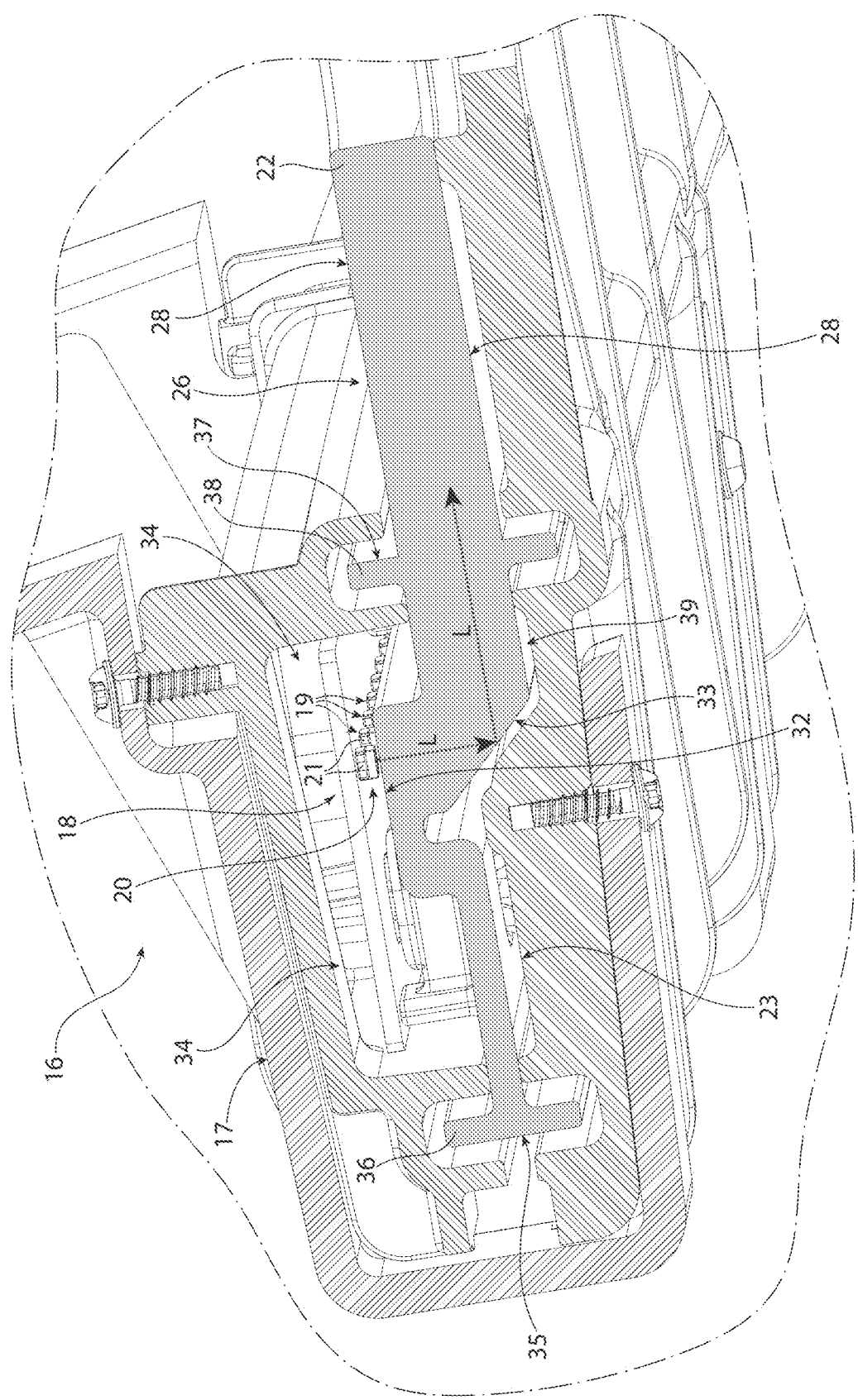
FIG. 7 shows a detail of FIG. 6.

According to several non-limiting embodiments, such as the one shown in FIGS. 6 and 7, at the proximal end 23, the luminous devices 19 emit the light beam L into the polymeric substrate 22 through an input surface 32 facing and parallel to the luminous devices 19. More in particular, its input surface 32 is substantially planar and parallel to the first direction A and to the second direction B. In other words, the input surface 32 is primarily horizontal.

Advantageously, but not in a limiting manner, therefore, the luminous devices 19 are arranged so as to emit the light beam L transversely, in particular perpendicularly, to the input surface 32 and therefore to the first direction A and to the second direction B.

Preferably, but not in a limiting manner, the polymeric substrate 22 comprises a sloped reflective surface 33, which is arranged close to the illuminating source unit 18, downstream of the input surface 32, following the path of the light beam L.

The sloped reflective surface 33 is arranged to deflect the light beam L substantially parallel to the second direction B and therefore, in use, mainly along the longitudinal axis X of the road vehicle 1 (behind, according to the example shown).

Advantageously, but not in a limiting manner, with the exception of the output profiles 25 and 30, the thickness W of the polymeric substrate 22 after the sloped reflective surface 33 is substantially constant. In this manner, its propagation is optimised.

In the non-limiting embodiment visible in the appended figures, in particular in FIGS. 6 and 7, the support structure 19 comprises a cavity 34 (elongated) in which both the illuminating source unit 18 and the proximal end 23 of the polymeric substrate 22 are housed. In particular, the cavity 34 extends primarily along the first direction A, i.e. along the transverse axis Y of the road vehicle 1.

Preferably but not in a limiting manner, and as shown in the embodiments of FIGS. 6 and 7, the cavity 34 is bounded, along the second direction B, by a first containment member 35, in particular a first ribbing 36, and a second containment member 37, in particular a second ribbing 38, which are preferably made of a piece with the polymeric substrate 22 and are mounted, by shape coupling, so as to bind the polymeric substrate 22 to the support structure 17. In other words, the ribbings 36 and 37 are radial protrusions (along the vertical axis Z, for example) obtained on the polymeric substrate 22 so as to bind it to the support structure 17, avoiding a relative movement thereof along the second direction B.

According to several preferred embodiments, therefore, the light assembly 16 is mounted on the outer body 4 so that the polymeric substrate 22 vents upwardly.

Preferably but not in a limiting manner, the polymeric substrate 22 extends transversely from at least a right sidewall 10, 11 (front or rear, as shown) to a left sidewall 10, 11 (front or rear, as shown) of the road vehicle 1.

In particular, as shown in FIGS. 1 to 3, the substrate 22 comprises an inner portion 39 inside the outer body 4 of the road vehicle 1, in particular inside the support structure 17, and a projecting portion 40, i.e. that part which protrudes from the outer body 4, meaning the vehicle shell, and is visible from the outside of the vehicle, also from above (as shown in FIG. 4).

In particular, the projecting portion 40 comprises in turn a rear part 41, which extends substantially along the first direction A and is arranged behind the vehicle, in detail below the rear window 12 or the windscreen 9.

Furthermore, preferably but not in a limiting manner, the projecting portion 40 comprises a pair of side parts 42, opposite each other and arranged at the sidewalls 10, 11. In particular, the side parts 42 project from the sidewalls 10, 11. In this manner, the visibility of the polymeric substrate 22 is also improved for vehicles that are located laterally with respect to the road vehicle 1.

Preferably but not in a limiting manner, the outlet profile 25 and/or the further outlet profiles 30 comprise a surface finish, for example translucent.

In use, the light beam L is emitted by the diodes 21 downwards, hits and is refracted by the sloped surface 33 and is propagated as far as the outlet profile 25, which is illuminated by the interruption of the propagation, as known, in refraction phenomena. A part of the light beam L is, on the other hand, dispersed into the further outlet profiles 30, which in turn will be illuminated by the portion of the light beam L that exits from the polymeric substrate 22.

Although the invention described here above makes particular reference to a precise example of embodiment, it is not to be considered as limited to said example of embodiment, its scope including all those variants, changes or simplifications covered by the appended claims, such as, for example, a different conformation of the polymeric substrate, a use of the light assembly as headlights, a different type of vehicle.

From an examination of the features of the road vehicle 1 and the light assembly 16 realised according to the present invention, the advantages they allow to achieve are evident.

In particular, in the solution presented here, mounting of the light assembly is simplified and its resistance is improved by protecting the LED strip and exposing exclusively the polymeric substrate to impacts.

Furthermore, the plurality of outlet profiles determines a thickening of the luminous strip visible from outside the road vehicle.

In addition, it appears evident that the use of a single strip of diodes to generate a plurality of luminous lines allows the overall weight of the road vehicle to be reduced, with respect to a solution with more strips of diodes, the relative power supplies and the relative cabling.

Lastly, the freedom of design is improved, as there is no longer a need to position the strip of diodes so that it is directly visible from the outside the vehicle. In this manner, it is possible to produce even complex luminous profiles, which can improve the visibility and recognisability of the road vehicle (including laterally).

LIST OF REFERENCE NUMBERS OF THE FIGS 1 road vehicle
2 front wheels
3 rear wheels
4 outer body
5 passenger compartment
6 undercarriage
7 bonnet
8 roof
9 windscreen
10 front sidewalls
11 rear sidewalls
12 rear window
13 boot
14 front portion
15 rear portion
16 light assembly
17 support structure
18 illuminating source unit
19 luminous devices
20 strip
21 diodes
22 polymeric substrate
23 proximal end
24 distal end
25 outlet profile
26 first portion
27 second portion
28 main surfaces
29 lateral surface
30 further outlet profiles
31 grooves
32 input surface
33 sloped reflective surface
34 cavity
35 first containment member
36 first ribbing
37 second containment member
38 second ribbing
39 inner portion
40 projecting portion
41 rear part
42 lateral parts
A first direction
B second direction
C third direction
D travel direction
L light beam
W thickness
X longitudinal axis
Y transverse axis
Z vertical axis

The invention claimed is:

1. A light assembly (16) for a road vehicle (1); the light assembly (16) comprising:
a support structure (17) configured to be mounted on an outer body (4) of the road vehicle (1) and extending primarily along a first direction (A);
an illuminating source unit (18), mounted on board the support structure (17) and comprising a plurality of luminous devices (19) arranged mainly along the first direction (A); and an at least partially transparent polymeric substrate (22) extending, along a second direction (B) perpendicular to the first direction (A), between a proximal end (23), mounted at the support structure (17) and the illuminating source unit (18), and a distal end (24), opposite the proximal end (23) and projecting from the support structure (17);

wherein the polymeric substrate (22) comprises a thickness (W) lower than other dimensions of the polymeric substrate and is configured to be traversed, along its thickness (W), by a light beam (L) emitted from the luminous devices (19) at the proximal end (23), which exits at least from an outlet profile (25) arranged at the distal end (24);

wherein the polymeric substrate (22) comprises:

two main outer surfaces (28) facing each other and a minor lateral surface (29) connecting the two main outer surfaces (28); wherein the outlet profile (25) is at least part of the minor lateral surface (29); and further outlet profiles (30) are made on at least one of the main outer surfaces (28), between the proximal end (23) and the distal end (24); wherein the further outlet profiles (30) are grooves (31) that partially interrupt the passage of the light beam (L) towards the outlet profile (25) determining an intermediate partial exit thereof, wherein the further outlet profiles (30) are concentric to each other having same shapes with different dimensions as the outlet profile (25) of at least part of the lateral surface (29).

2. The light assembly (16) according to claim 1, wherein the polymeric substrate (22) is made of methacrylate.

3. The light assembly (16) according to claim 1, wherein the polymeric substrate (22) comprises, along the second direction (B), starting from the proximal end (23) toward the distal end (24), a first portion (26) and a second portion (27), wherein the second portion (27) is inclined upwardly, with respect to the first portion (26).

4. The light assembly (16) according to claim 1, wherein the grooves (31) cause interruption of a profile of the at least one of the main outer surfaces (28) that would otherwise be continuous.

5. The light assembly (16) according to claim 1, wherein the thickness (W) of the polymeric substrate (22) is substantially constant.

6. The light assembly (16) according to claim 1, wherein the outlet profile (25) comprises at least two rectilinear portions substantially parallel to a direction of travel of the road vehicle (1) and at least one curved portion, wherein the at least one curved portion unites the rectilinear portions.

7. The light assembly (16) according to claim 1, wherein, at the proximal end (23), the luminous devices (19) emit the light beam (L) into the polymeric substrate (22) through an input surface (32) facing and parallel to the luminous devices (19); wherein the input surface (32) is substantially parallel to the first (A) and to the second direction (B).

8. The light assembly (16) according to claim 7, wherein the luminous devices (19) are arranged to emit the luminous beam (L) perpendicularly, to the input surface (32).

9. The light assembly (16) according to claim 1, wherein the polymeric substrate (22) comprises a sloped reflective surface (33) arranged to deflect the light beam (L) parallel to the second direction (B) and, in use, mainly along a longitudinal axis (X) of the road vehicle (1).

10. The light assembly (16) according to claim 1, wherein the luminous devices (19) are a strip (20) of light-emitting diodes (21).

11. The light assembly (16) according to claim 1, wherein the support structure (17) comprises a cavity (34) in which both the illuminating source unit (18) and the proximal end (23) of the polymeric substrate (22) are housed, the cavity (34) extending primarily The light assembly the first direction (A).

12. The light assembly (16) according to claim 11, wherein the cavity (34) is bounded, along the second direction (B), by a first containment member (35) and a second containment member (37), which are made of a piece with the polymeric substrate (22) and are mounted, by shape coupling, so as to bind the polymeric substrate (22) to the support structure (17).

13. A road vehicle (1) comprising:

a pair of front wheels (2) and a pair of rear wheels (3);

an outer body (4) comprising a front portion (14) and a rear portion (15) with respect to a normal travel direction (D) of the road vehicle (1); and a light assembly (16) according to claim 1, wherein the light assembly (16) is mounted to the front portion (14) and/or the rear portion (15) and is configured to be visible from the outside of the road vehicle (1);

wherein a longitudinal axis (X) of the road vehicle (1) corresponds primarily with the second direction (B) and a transverse axis (Y) of the road vehicle (1) corresponds primarily with the first direction (A).

14. The road vehicle (1) according to claim 13, wherein the light assembly (16) is mounted to the outer body (4) so that the polymeric substrate (22) vents upwardly.

15. The road vehicle (1) according to claim 13, wherein the polymeric substrate (22) extends transversely from at least a right sidewall to a left sidewall of the road vehicle (1).

* * * * *